United States Patent
Alcorn et al.

(10) Patent No.: US 11,157,373 B2
(45) Date of Patent: Oct. 26, 2021

(54) PRIORITIZED TRANSFER OF FAILURE EVENT LOG DATA

(71) Applicant: Lenovo Enterprise Solutions (Singapore) Pte. Ltd., Singapore (SG)

(72) Inventors: Matthew R. Alcorn, Durham, NC (US); James G. McLean, Raleigh, NC (US); Antonio Abbondanzio, Raleigh, NC (US); Randall William Worzella, III, Raleigh, NC (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 113 days.

(21) Appl. No.: 16/672,654

(22) Filed: Nov. 4, 2019

(65) Prior Publication Data
US 2021/0133054 A1    May 6, 2021

(51) Int. Cl.
G06F 11/00  (2006.01)
G06F 11/14  (2006.01)
G06F 16/17  (2019.01)
G06F 11/34  (2006.01)
G06F 11/30  (2006.01)

(52) U.S. Cl.
CPC ...... *G06F 11/1471* (2013.01); *G06F 11/1464* (2013.01); *G06F 11/3034* (2013.01); *G06F 11/3476* (2013.01); *G06F 16/1734* (2019.01)

(58) Field of Classification Search
CPC ............ G06F 11/1471; G06F 11/1464; G06F 11/3034; G06F 11/3442; G06F 11/3476
See application file for complete search history.

(56) References Cited

U.S. PATENT DOCUMENTS

| | | | | |
|---|---|---|---|---|
| 7,650,364 B2 * | 1/2010 | Pelon | ...................... | G06F 16/27 707/999.201 |
| 8,719,641 B2 * | 5/2014 | Cole | ................... | G06F 11/3636 714/45 |
| 8,909,730 B2 * | 12/2014 | Kuhl | ................... | G06F 16/1744 709/217 |
| 9,043,374 B2 * | 5/2015 | Staffer | ................ | G06F 16/1727 707/830 |
| 9,501,676 B2 * | 11/2016 | Hosoya | .............. | G06K 7/10366 |
| 10,015,101 B2 * | 7/2018 | Agarwal | ................. | H04L 47/22 |
| 10,437,470 B1 * | 10/2019 | Zhi | ......................... | G06F 3/064 |
| 10,635,336 B1 * | 4/2020 | He | ....................... | G06F 12/0813 |
| 10,785,544 B2 * | 9/2020 | Lee | .......................... | H04N 5/77 |

(Continued)

*Primary Examiner* — Elmira Mehrmanesh
(74) *Attorney, Agent, or Firm* — Jeffrey Streets

(57) ABSTRACT

Apparatus and computer program product including program instructions configured to cause a processor to perform operations. The operations may include detecting a system failure in a host node, wherein the host node locally stores log files during operation of the host node. The operations may further include receiving a request for failure event log data stored by the host node, and identifying an amount of available storage capacity of a designated remote data storage device, prioritizing data from the log files to be included in the failure event log data, and selecting a subset of the failure event log data in order of descending priority until the total amount of the selected data would substantially fill the remote data storage device. Still further, the operations may include transferring, in response to receiving the request, the selected subset of the data to the designated remote data storage device.

20 Claims, 4 Drawing Sheets

(56) References Cited

U.S. PATENT DOCUMENTS

| | | | | |
|---|---|---|---|---|
| 10,817,477 | B2* | 10/2020 | Chan | H04L 67/10 |
| 2005/0249116 | A1* | 11/2005 | Anderson | H04L 29/12009 |
| | | | | 370/229 |
| 2009/0089336 | A1* | 4/2009 | Dewey | G06F 11/0727 |
| 2013/0024425 | A1* | 1/2013 | Huang | G06F 11/1461 |
| | | | | 707/650 |
| 2014/0320913 | A1* | 10/2014 | Muroi | G06F 3/1271 |
| | | | | 358/1.15 |
| 2014/0325010 | A1* | 10/2014 | Fujii | G06F 3/1273 |
| | | | | 709/207 |
| 2015/0046516 | A1* | 2/2015 | Tsuchida | G06F 11/00 |
| | | | | 709/203 |
| 2017/0235655 | A1* | 8/2017 | Fukumori | G06F 11/2284 |
| | | | | 714/37 |
| 2019/0182275 | A1* | 6/2019 | Ando | G06F 21/55 |
| 2019/0286354 | A1* | 9/2019 | Brundidge | G06F 3/0608 |
| 2020/0244600 | A1* | 7/2020 | Shani | H04L 67/1097 |
| 2020/0356460 | A1* | 11/2020 | Kolesnik | G06F 12/023 |
| 2021/0073067 | A1* | 3/2021 | Sczepczenski | G06F 11/0775 |

\* cited by examiner

PRIORITIZED TRANSFER OF FAILURE EVENT LOG DATA

BACKGROUND

The present disclosure relates to systems and methods for transferring data that is useful for analyzing the cause of a system failure in a computing system.

BACKGROUND OF THE RELATED ART

When a computer system experiences a system failure, a system administrator or engineer may want to determine the cause or circumstances of the system failure. A first step toward determining the cause or circumstances of the system failure is to collect recent operating data or failure event log data, such as a first failure data capture (FFDC) file, for the failed computer system. Accordingly, a system management node or client computer may be used to connect with the failed computer system via a connection using a web protocol, Transmission Control Protocol/Internet Protocol (TCP\IP) or a Secure Shell protocol, then login to the computer system. Generation of the failure event log data may be user-initiated or automatically initiated, followed by the transfer of the FFDC from the failed computer system to the system management node, client computer or network attached storage. Once the operating data has been transferred, the operating data can be analyzed with the purpose of determining the cause or circumstances of the system failure. However, the computer system failure may have negatively affected the connection, such as causing a network interface to crash, become compromised, or otherwise malfunction. Additionally, temporary or long term network or storage constraints may make the transfer of very large FFDC files impractical. These and other scenarios may challenge the collection of the operating data.

BRIEF SUMMARY

Some embodiments provide a computer program product comprising a non-volatile computer readable medium and non-transitory program instructions embodied therein, the program instructions being configured to be executable by a processor to cause the processor to perform operations. The operations may comprise detecting an occurrence of a system failure in a host node that includes the processor, wherein the host node locally stores a plurality of log files during operation of the host node. The operations may further comprise receiving a request for failure event log data stored by the host node, and identifying an amount of available storage capacity of a data storage device that has been designated to receive failure event log data from the host node, wherein the data storage device is accessible to the host node, prioritizing data from the plurality of log files to be included in the failure event log data, and selecting a subset of the data in order of descending priority until the total amount of the selected data would substantially fill the available storage capacity of the data storage device. Still further, the operations may comprise transferring, in response to receiving the request, the selected subset of the data from the plurality of log files to the designated remote data storage device.

Some embodiments provide an apparatus comprising at least one non-volatile storage device storing program instructions and at least one processor configured to process the program instructions, wherein the program instructions are configured to, when processed by the at least one processor, cause the apparatus to perform operations. The operations may comprise detecting an occurrence of a system failure in a host node that includes the processor, wherein the host node locally stores a plurality of log files during operation of the host node. The operations may further comprise receiving a request for failure event log data stored by the host node, and identifying an amount of available storage capacity of a data storage device that has been designated to receive failure event log data from the host node, wherein the data storage device is accessible to the host node, prioritizing data from the plurality of log files to be included in the failure event log data, and selecting a subset of the data in order of descending priority until the total amount of the selected data would substantially fill the available storage capacity of the data storage device. Still further, the operations may comprise transferring, in response to receiving the request, the selected subset of the data from the plurality of log files to the designated remote data storage device.

Some embodiments provide a computer program product comprising a non-volatile computer readable medium and non-transitory program instructions embodied therein, the program instructions being configured to be executable by a processor to cause the processor to perform operations. The operations may comprise receiving a request for failure event log data stored by a host node that includes the processor, wherein the host node locally stores a plurality of log files during operation of the host node. The operations may further comprise prioritizing data from the plurality of log files to be included in the failure event log data, and transferring, in response to receiving the request, the data in order of descending priority until the plurality of log files have been transferred or until the data can no longer be transferred.

DETAILED DESCRIPTION

Figure 1:
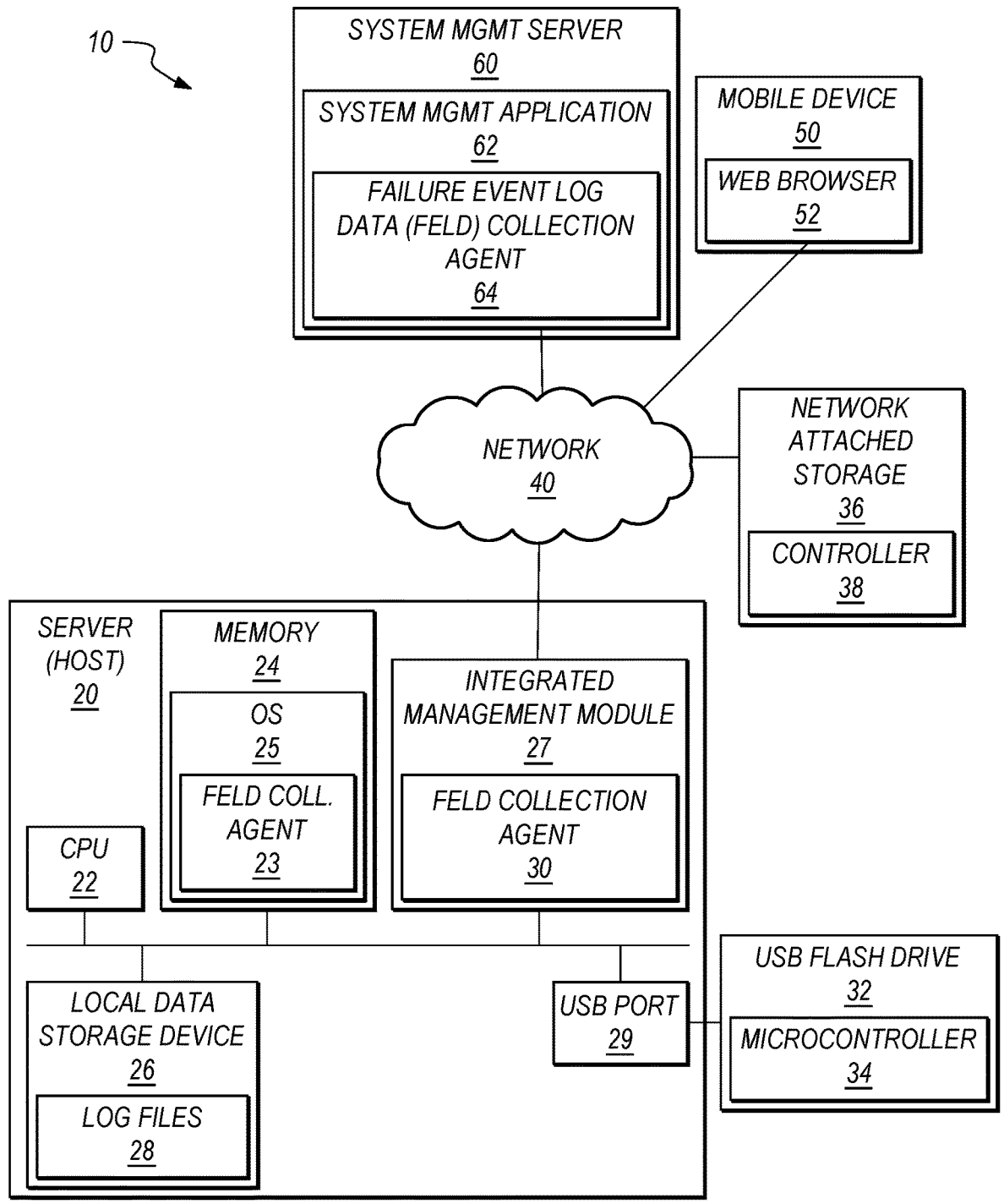
FIG. 1 is a diagram of a system including a server that runs a failure event log data collection agent.

Some embodiments provide a computer program product comprising a non-volatile computer readable medium and non-transitory program instructions embodied therein, the program instructions being configured to be executable by a processor to cause the processor to perform operations. The operations may comprise detecting an occurrence of a system failure in a host node that includes the processor, wherein the host node locally stores a plurality of log files during operation of the host node. The operations may further comprise receiving a request for failure event log data stored by the host node, and identifying an amount of available storage capacity of a data storage device that has been designated to receive failure event log data from the host node, wherein the data storage device is accessible to the host node, prioritizing data from the plurality of log files to be included in the failure event log data, and selecting a subset of the data in order of descending priority until the total amount of the selected data would substantially fill the available storage capacity of the data storage device. Still further, the operations may comprise transferring, in response to receiving the request, the selected subset of the data from the plurality of log files to the designated remote data storage device.

Some embodiments address a technical problem of providing access to useful failure event log data under system failure conditions, such as system instability, bandwidth limitations, data storage limitations, inaccessible memory or data file storage and the like. Some embodiments provide a technical solution of transferring failure event log data from a host node, which is experiencing the system failure conditions, in an manner that prioritizes a subset of the failure event log data in order of descending priority, so as to increase the likelihood that data transferred prior to a complete system failure of the host node or loss of connection with the host node, or within a limited amount of available data storage, will contain sufficient information to facilitate a determination of the cause of the system failure.

It should be recognized that a host node may store a large quantity of state data that could be relevant to a determination of a cause of the system failure. Such large quantities of data may be difficult retrieve from the host node, especially if the host node eventually suffers a complete failure or loss of network connection. Some embodiments make an intelligent selection of failure event log data that may have the highest priority or relevance to the diagnosis of the cause of the system failure and transfer the failure event log data in order of descending priority (i.e., highest priority data is transferred first). Some embodiment may transfer the data in order of descending priority in order to reduce an amount of remote data storage capacity consumed by storing the failure event log data or reduce an amount of bandwidth utilized to transfer the data.

The processor that performs the operations may be central processing unit (CPU) that runs an operating system and end-user applications on the host node, or the processor may be a management processor that monitors and manages the operation of the host node. In other words, the processor may an in-band processor or an out-of-band processor. Non-limiting examples of a management processor include an integrated management module (IMM) and a baseboard management controller (BMC).

The host node itself may be any smart device having a processor to perform operations by executing program instructions. Nonlimiting examples of the smart device may include a server, laptop computer, smartphone, smart appliance, or a computing device having another form factor. Some embodiments of the host node, such as a server, may include both a CPU and a management processor, yet some other embodiments of the host node may include a CPU and not include a management processor. Furthermore, some embodiments may include multiple CPUs. The operations of various embodiments may be performed by a single processor of the host node or may be performed by multiple processors of the host node.

Some embodiments may include the program instructions in a tool, script or agent, which may be referred to as a failure event log data (FELD) collection tool or agent, or a First Failure Data Capture (FFDC) collection tool or agent. The failure event log data collection agent may run in the base level of the component or process for which the agent is collecting data. For example, a failure event log data collection agent for a server may be run in a firmware level, such as an Integrated Management Module (IMM) or other out-of-band service processor on the host node. An FELD collection agent for a system management application or appliance may run in a core level of an operating system (OS), such as in an underlying Linux OS. A user may interact with the failure event log data collection agent of the host directly via a browser or Secure Shell (SSH) tool, or via an Application Programming Interface (API) that allows a system management tool to access the host's failure event log data.

A system failure may include a failure of hardware, software and/or firmware. For example, a hardware component of the host node may experience a failure due to wear over the lifetime of the component, an electrical overload, or a crash of the software or firmware that is operating the hardware component. A software stack may crash (fail), for example, as a result of improper code, unstable device drivers or hacking. Firmware may experience a failure as a result of improper coding or an incompatible firmware update, which vulnerability may not have been previously experienced or documented until after the firmware version or upgrade had been installed on numerous nodes. Even though care may be taken to test the firmware version or upgrade, a test system does not generally have the diversity of hardware, software and operating conditions that exist in a large computer system.

An occurrence of a system failure in a host node may be detected in any known manner. For example, a system failure may be detected by a system management application operating on a management module or an operating system operating on a CPU. Optionally, the system management application and/or the operating system may operate independent instances of some or all of the program instructions that are executable to perform the operations, or the system management application and the operating system may operate separate portions of the program instructions. In some embodiments, the operating system may perform operations for detecting system failures in the software on the host node, and the system management application may perform operations for detecting system failures in the hardware and firmware of the host node. Other combinations or configurations of operations between the operating system and the management application may be envisioned.

During operation of the host node, a plurality of log files may collect and store data on at least one local data storage device that is a component of the host node. Typically, the log files are continuously or periodically updated with operational data or event records in the normal course of operation as the host node performs various workloads and tasks. A local data storage device that stores a log file will preferably include a non-volatile data storage medium, such as a magnetic disk drive or solid state drive. The plurality of log files may each be stored on the same local data storage device or on separate local data storage devices. Optionally, log files for a component or set of components may be stored in a given predetermined directory or folder, such as a /log folder. Furthermore, a log file may be provided for a single component or process, or for a set of components or processes, and may have a predetermined filename, perhaps with a .log file extension.

While the host node may store a plurality of log files on a local data storage device during normal operation, a system or user may desire to obtain some or all of the log files after a component or process on the host node has experienced a system failure. For the purpose of obtaining this data, embodiments may designate a remote or external data storage device that is not a component of the host node to receive failure event log data from the host node. For example, the designated remote data storage device may be a flash drive removably coupled to an externally accessible universal serial bus (USB) port. As another example, the designated remote data storage device may be a network attached storage (NAS) server that is accessible to the host node over a network. In either example, an amount of available storage capacity on the designated remote data storage device may be identified by querying a controller or microcontroller that forms part of the data storage device. For example, a USB flash drive is a data storage device that includes non-volatile solid state memory, a microcontroller, and a Universal Serial Bus (USB) connector plug for physically connecting with a USB port of the host system.

Alternatively, the program instructions may be configured with a predetermined amount of data storage capacity that may be used for data storage in response to a system failure. A designated remote data storage device may have any other data storage type or form factor, but preferably can store data from the log files so that the data is available for remote analysis of the system failure even if the host node does not continue to be operational or accessible. In some embodiments, the network attached storage may be a preferred designated device, such that data collection and storage on the network attached storage may proceed immediately following system failure so long as a network connection between the host node and the network attached storage maintains sufficient connectivity. If connectivity is lost or insufficient, then a flash drive may be subsequently designated. However, each designated remote data storage device may have a different amount of available data storage capacity, such that it may be necessary to select a different subset of the data that should be collected and stored depending upon the specific remote data storage device that has been designated.

Data from the plurality of log files that is to be included in the failure event log data may be prioritized so that data with the highest priority or importance toward determining the cause of the system failure may be stored on the designated remote data storage device. The host node where a component or process has experienced the system failure may be unstable or compromised, such that continued operation of the host node or continued communication with the host node is at risk. For example, the log files may be analyzed by a system management server or other compute node, remote from the host node, use a web browser or Secure Shell (SSH) interface via a Transmission Control Protocol (TCP)/Internet Protocol (IP) connection. If the host node goes down or the network interface of the host node crashes, becomes compromised, or is otherwise malfunctioning, then any further collection of FELD may be difficult or impossible.

The data from the plurality of log files may be prioritized on one or more basis. Some embodiments may prioritize data according to a data type of each data entry in the plurality of log files, wherein the data type may be identified by a tag stored for, or associated with, each data entry. Optionally, the data type may indicate a level of severity, such as information (low level), error (lower mid), alert (higher mid) or warning (high). Some embodiments may prioritize data according to a log type or log name. For example, a log type may indicate a hardware component log and a log name may indicate a specific component. Some embodiments may prioritize data according to a proximity in time prior to the detected occurrence of the system failure. The data that is collected closest in time prior to the detected occurrence of the system failure may be more likely to show the cause of the system failure. Data in this time frame may be collected from any or all of the log files as the highest priority data. Some embodiments may prioritize data according to a size of the log file, such as prioritizing data in an ascending order of the log file size. In other words, a smaller log file may be completely collected and transferred to the designated remote data storage device faster than a larger log file. Still further, some embodiments may prioritize data according to a predetermined manual ranking of log files or data types. For example, the predetermined manual ranking of log files or data types may reflect a user's experience with analyzing system failures and the log files or data types that most often include important data for determining the cause of the system failure. In addition, some embodiments may prioritize data entries that are associated with one or more particular tag, such as a debug tag, information tag, error tag, warning tag and the like. One or more of such tags may be selected and used as a filter to generate a smaller amount of data that includes only the entries that are associated with the one or more selected tags.

Some embodiments may prioritize data from specific log files or log file segments based on the type of error or a related hardware component associated with the error. The errors for a given component may include both hardware errors and software errors. Examples of a hardware error include a hardware DIMM failure or a processor fault, either of which may have serious implications for any workload running on the component. An example of a software error includes an application crashing. Another example of prioritizing data based on an error type would be a network-related error. In the example of a network-related error, error logs created by the networking subsystem or errors collected from the networking subsystem may be given a high priority for inclusion and transmission as part of the FELD while error logs related to other hardware and software subsystems (such as Operating System—level events) would be given a lower priority for inclusion. Another example would be an FELD file creation initiated by receiving a request from a user of system management appliance software in response to observing that an error has occurred in displaying data from a particular device under management of the system management appliance. In this example, event or error logs, or segments of event or error logs, associated with that particular device, would be given a high priority for inclusion and transmission, in response to the request, while events related to other devices being managed would have a lower priority.

Some embodiments may access a list identifying a plurality of previously detected system failures and, for each previous system failure, one or more log file or log file type that includes data associated with the previous system failure, wherein the data from the log file or log type identified in the list may be included in the selected subset of the data. The list may be generated from system failure reports (also referred to as crash reports) that have been received and stored in a central database, perhaps maintained by a system management application, from nodes across a cloud, network, data center, or other computer system. Each crash report may then be associated with a location (i.e., directory and/or filename) of FELD data that may identify the cause of the system failure. The central database may then be used by a server or other computer to inform an FFDC collection agent on each node about the identity and location of FFDC data on the host node that would be the highest priority or importance for identifying the cause of future system failures. Furthermore, as a particular type of system failure occurs additional times within a multi-node computer system, the FFDC collection agent on each node may be instructed to give higher priority or importance to the collection and storage of FFDC data from particular locations (i.e., folders and/or filenames) that are associated with the most frequent system failures. For example, consider a case where a node being monitored by a system management appliance suddenly loses communication with the system management appliance. The system management appliance would bundle and prioritize the files most likely to contain information about node crashes that would result in a lack of communication, such as power event logs, network error logs, etc. In another example, a node that experiences a failure at a higher layer (such as a crash of a VM running in a VM Operating System environment) might gather and prioritize files related to the status of that particular VM prior to the crash while de-prioritizing other information (such as hardware error logs).

The FELD data collected following any two system failures may be compared to determine whether the system failures are of the same or similar type. Two system failures or crashes may be identified as being of the same or similar type if the FELD data associated with each of the two system failures contain certain similarities. For example, each component or a process associated with each component may have a respective log. If the FELD data for both system failures include a log for a certain component that contains a similar event, such as an error or warning just prior to the system failure, then the two system failures may be identified as being of the same or similar type. Furthermore, two system failures may be determined to be of the same or similar type in response to both FELD data collections including similar events across multiple components or component processes. FELD data may be analyzed for similar events in similar logs by performing a search for a specific sequence of characters that would indicate the occurrence of a given event, such as a warning or error.

Some embodiments may combine any of the foregoing prioritization operations. For example, log data files or file segments may be prioritized using a primary variable, such as the log type or log name, then the priority assigned to each log data file or file segment may be adjusted (increased or decreased) using a secondary variable, such as proximity in time prior to the system failure.

A subset of the log data may be selected in order of descending priority until the total amount of the selected data would substantially fill the available storage capacity of the data storage device. The available storage capacity of the data storage device may be less than the total storage capacity of the data storage device, either due to other data already being stored on the data storage device or due to a preconfigured limit on the amount of data that may be collected and stored for any single system failure. In the situation where the designated data storage device is a network attached storage server, there may be a preconfigured limit on the amount of data for a single system failure and/or a preconfigure limit on the total amount of data that may be collected and stored for all system failures that are still being analyzed within the network. In the later instance, the available storage capacity of the data storage device may vary over time.

The amount of the selected data that would substantially fill the amount of available storage capacity of the data storage device may vary according to the circumstances, but the amount does not need to be optimized. For example, if the data is prioritized on the basis of a log type, if a highest priority log type would fill a substantial percentage, say 80%, of the available storage capacity of the data storage device, then some embodiments may not proceed to collect and store the next highest priority log type. Furthermore, if the data is prioritize on the basis of proximity in time prior to the system failure, then it may be easier to collect and store an amount of data that approaches a higher percentage, say 90%, of the available storage capacity.

The selected subset of the log data may be collected from the plurality of log files and stored on the designated remote or external data storage device. It should be recognized that the process of collecting and storing the selected subset of the data may be interrupted at any time by instability or shutdown of the node or the node's ability to transfer data, but embodiments may attempt to collect and store as much of the selected subset of the data as possible before any such interruption. Where the selected subset of the data includes data with distinguishable levels of priority, some embodiments may collect and store the highest priority data before beginning to collect and store the next highest priority data.

Some embodiments may attempt to collect and store the selected subset of data as soon as possible following detection of the system failure. For example, the selected subset of data may be automatically collected and stored in response to detection of the system failure, in response to selection of the subset of data, or in response to detecting that a local data storage device has been coupled to the host node following a system failure. Some embodiments may automatically send a notification, such as a mobile push notification, to a user device in response to detection of a system failure. In such embodiments, the selected subset of data may be automatically collected and stored in response to the sending or receiving of the notification or a user reply to the received notification. Still further, the FELD data may be sent to the same device to which the notification was sent, hosted on the sending device, or hosted in a third-party repository.

In some embodiments, the selected subset of the data may be transferred in a time-ordered series of files or file segments in a descending order of importance. In other words, the most important files or file segments may be transferred first before proceeding to transfer the next most important files or file segments. Furthermore, data in a given log file among the plurality of log files may include data segments with different priority. Such data segments may be identified, such as with a tag or filename, so that the data segments that are included in the given log file can later be concatenated for storage on the data storage device. Where the designated data storage device has sufficient available storage capacity, the data segments may be concatenated to reconstitute a full or regular collection of FELD. Some embodiments may identify the filenames of each log file on the host node that includes any data segment of the selected subset of data, wherein, for each data segment of the selected subset of data, the data segment is stored on the data storage device in a file having the same filename as the log file on the host node from which the data segment was collected.

Some embodiments may identify a component of the host node that experienced the system failure, and identify a log file associated with the identified component, wherein the log file associated with the identified component may be included in the selected subset of the data. The component that experienced the system failure may be identified in an error message, crash report or notification, or may be identified through some additional analysis via the management module on the host node where the system failure occurred. The log file associated with the identified component may have a predetermined association in systems that are configured to maintain a particular log file for each component.

Some embodiments allow a user to login to the host system that is experiencing the system failure for the purpose of obtaining the FELD. For example, the user may login to a management interface of an Integrated Management Module (IMM) of a server or a Chassis Management Module (CMM) of a multi-node chassis via a web browser or Secure Shell (SSH) tool, then collect the FELD data and download/transfer the data to a remote data storage device, such as an external flash drive or network attached storage. In such embodiments, the selected subset of data may be streamed to the remote data storage device. Similar to other embodiments, the FELD data may be collected and transferred in files or file segments in an order of descending priority or importance. In other words, the data with the highest priority or importance is collected and transferred first, before collecting and transferring data that is the next highest priority or importance. Additional FELD data may be collected and transferred until the occurrence of a specified event, such as the collection and transfer of all of the FELD data, using the entire available capacity of a designated data storage device, or having already determined the cause of the system failure. Accordingly, if a connection to a system management application, mobile device or data storage device is lost, the data with the highest priority or importance may already have been transferred. A user computer or system management server may connect with the IMM or CMM of the host system through out-of-band or in-band channels. For example, an IMM or CMM may run atop the firmware of the server, such that a computer or server may connect with the IMM or CMM through an out-of-band management network. However, a systems management application or appliance may also be able to connect with the host system through an Application Programming Interface (API) if available.

Some embodiments provide an apparatus comprising at least one non-volatile storage device storing program instructions and at least one processor configured to process the program instructions, wherein the program instructions are configured to, when processed by the at least one processor, cause the apparatus to perform operations. The operations may comprise detecting an occurrence of a system failure in a host node that includes the processor, wherein the host node locally stores a plurality of log files during operation of the host node. The operations may further comprise receiving a request for failure event log data stored by the host node, and identifying an amount of available storage capacity of a data storage device that has been designated to receive failure event log data from the host node, wherein the data storage device is accessible to the host node, prioritizing data from the plurality of log files to be included in the failure event log data, and selecting a subset of the data in order of descending priority until the total amount of the selected data would substantially fill the available storage capacity of the data storage device. Still further, the operations may comprise transferring, in response to receiving the request, the selected subset of the data from the plurality of log files to the designated remote data storage device.

The foregoing apparatus may further include program instructions for implementing or initiating any one or more operations of the computer program products described herein. Accordingly, a separate description of the computer program products will not be duplicated in the context of an apparatus.

Some embodiments provide a computer program product comprising a non-volatile computer readable medium and non-transitory program instructions embodied therein, the program instructions being configured to be executable by a processor to cause the processor to perform operations. The operations may comprise receiving a request for failure event log data stored by a host node that includes the processor, wherein the host node locally stores a plurality of log files during operation of the host node. The operations may further comprise prioritizing data from the plurality of log files to be included in the failure event log data. Still further, the operations may comprise transferring, in response to receiving the request, the data in order of descending priority until the plurality of log files have been transferred or until the data can no longer be transferred. Optionally, the operation of transferring the data may include transferring the data in order of descending priority until a power outage, a network disruption, and/or storage capacity of a receiving node is depleted. The operation of receiving the request for failure event log data may include receiving the request via a web interface, a command interface, and/or a remote command interface. For example, the request may originate from various sources, such as a user operating a remote system management application, a user interfacing with a front panel of the host node, or a user operating a mobile computing device. Still further, the operation of transferring the data may include transferring the data via a USB port of the host node and/or over a network connection. For example, data transferred over a USB port of the host node may be transferred to a flash drive or other portable data storage device. If the data is transferred over a network connection, the data may be transferred to network attached storage or other remote data storage device. In a further option, the data from the plurality of log files may be prioritized by a data type of each data entry in the plurality of log files, wherein the data type is identified by a tag stored for each data entry.

Some embodiments provide a computer program product comprising a non-volatile computer readable medium and non-transitory program instructions embodied therein, the program instructions being configured to be executable by a processor to cause the processor to perform operations. The operations may comprise identifying an occurrence of a system failure in a managed node, identifying log files stored by a system management node that include operating data for the managed node that was collected prior to occurrence of the system failure, prioritizing data from the identified log files to be included in a failure event log data, selecting a subset of the data in order of descending priority, and alerting a user that the failure event log data for the system failure is available. In one instance, the occurrence of the system failure in the managed node may be automatically identified. In another instance, the occurrence of the system failure in the managed node is identified through manual user input. The data may be prioritized using any one or more aspect of the identified log data, such as the previously disclosed data type, time proximity to the system failure, log file name, and the like.

Some embodiments provide a computer program product comprising a non-volatile computer readable medium and non-transitory program instructions embodied therein, the program instructions being configured to be executable by a processor to cause the processor to perform operations. The operations may comprise receiving a request for failure event log data stored by a host node that includes the processor, wherein the host node locally stores a plurality of log files during operation of the host node. The operations may further comprise prioritizing data from the plurality of log files to be included in the failure event log data, and transferring, in response to receiving the request, the data in order of descending priority until the plurality of log files have been transferred or until the data can no longer be transferred.

FIG. 1 is a diagram of a system 10 including a server 20 that runs a failure event log data collection agent, shown here as a failure event log data (FELD) collection agent 30. The server 20 includes a central processing unit (CPU) 22 that can execute a software application (not shown) that may be stored in a local data storage device 26 and loaded into memory 24. During operation of the host server 20, operating data and event data reflecting the operation of the processor 22, memory 24 and other components of the host server 20 may be stored in log files 28, such as a separate log file for each component. Furthermore, during execution of the software application, operating data and event data reflecting the operation of the software application may also be stored in the log files 28. The host server 20 further includes an integrated management module 27 that runs the failure event log data collection agent 30. Should there be a system failure on the host server 20, the failure event log data collection agent 30 will detect the system failure, select and collect certain first failure data from the log files, and store the selected data on a designated data storage device.

The system 10 includes a universal serial bus (USB) flash drive 32 that is coupled to a USB port 29 of the host server 20 and network attached storage (NAS) 36 that is accessible to the host server 20 via a network 40. Either of the flash drive 32 or the NAS 36 may be designated for storage of failure event log data (FELD) data. The FELD collection agent 30 may identify an amount of available storage capacity on the designated data storage device by querying the device controller, such as the microcontroller 34 of the universal serial bus (USB) flash drive 32 or the controller 38 of the NAS 36. Alternatively, an amount of storage capacity available for storage of the data may be a configurable amount of data for each system failure.

In response to detecting a system failure in the host server 20, the FELD collection agent 30 will select which service data to collect from the log files or other sources so that the amount of data collected does not exceed the available storage capacity of the designated data storage device. In accordance with various embodiments described herein, the FELD collection agent 30 may prioritize certain data based on one or more conditions or variables, such as the component that experienced the system failure, the proximity of the data in time prior to the system failure, the size of the log file, and the like.

Furthermore, a user may have a mobile device 50 with a web browser 52 that enables the user to login to a management interface of the IMM 27 of the host server 20 that is experiencing the system failure for the purpose of downloading the collected FELD to the mobile device or other designated device in response to receiving a request from the user via the web browser of the mobile device. For example, the selected subset of data may be streamed to the mobile device. Similar to other embodiments, the FELD data may be collected and transferred in files or file segments in an order of descending priority or importance. In other words, the data with the highest priority or importance may be collected and transferred first, before collecting and transferring data that is the next highest priority or importance. A system management server 60 running a system management application 62 may similarly connect with the IMM 27 of the host server 20 to submit a request for failure event log data stored by the host server and obtain the data or configure the FELD collection agent 30. Still further, the host server 20 may run an operating system 25 that also includes an FELD collection agent 23. The system management application 62 may be able to connect with the operating system 25 on the host server 20 through an Application Programming Interface (API) of the operating system 25, if available.

Still further, the system management application 62 may include an FELD collection agent 64 that may collect FELD in response to an occurrence of a system failure in a managed node. The FELD collection agent 64 may identify log files stored by a system management node, perhaps either on the system management node 60 or on the network attached storage 36, where the log files include operating data for the managed node that was collected prior to occurrence of the system failure. The data from the identified log files may be prioritized by the FELD collection agent 64 for inclusion in a first failure data capture using any one or more aspect of the data for prioritization. A subset of the data is selected in order of descending priority for inclusion in the FELD. A user may then be alerted that the FELD for the system failure is available.

Figure 2:
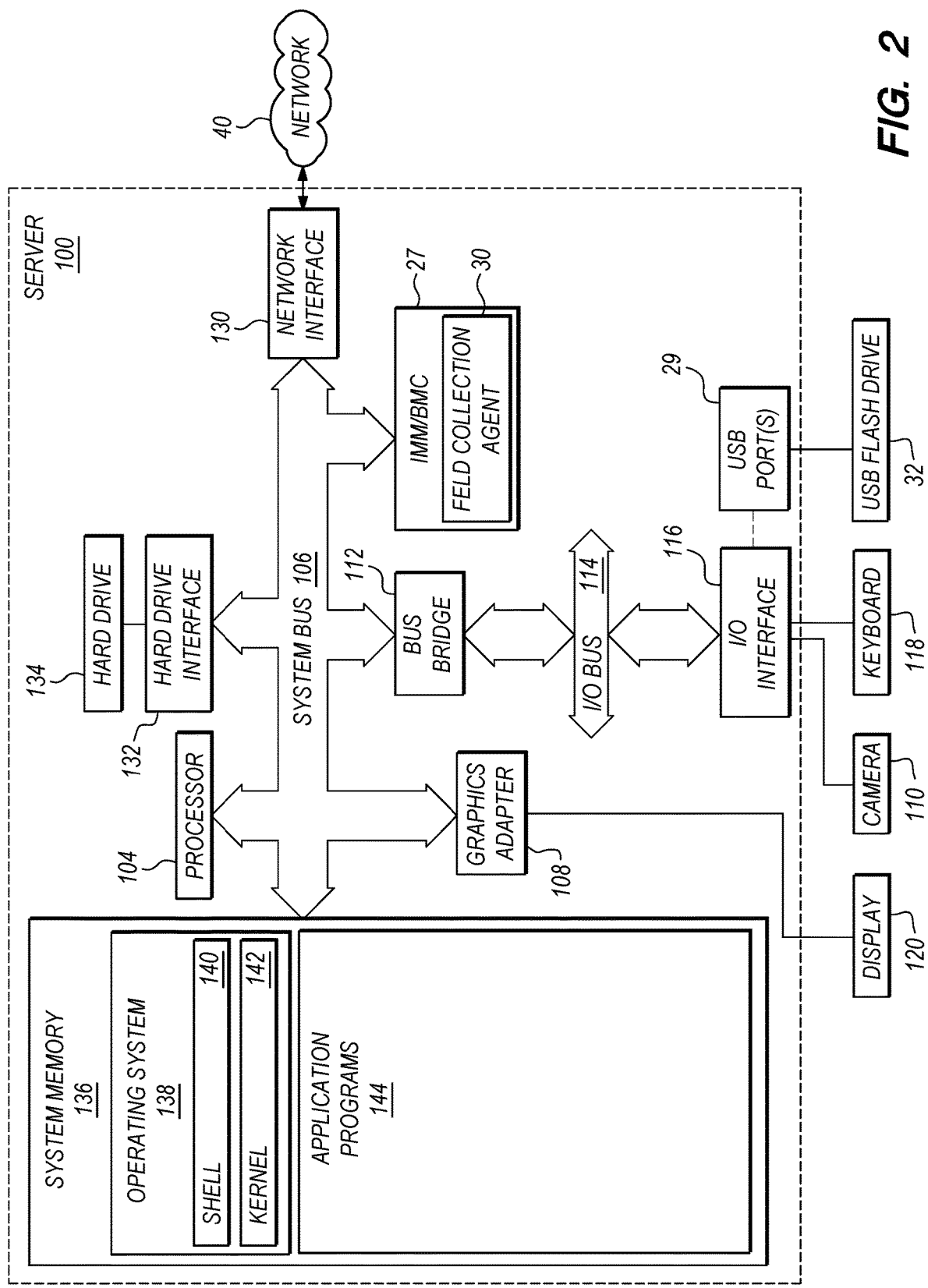
FIG. 2 is a diagram of a server.

FIG. 2 is a diagram of a server 100 that may, without limitation, be representative of the configuration of the host server 20 of FIG. 1. Furthermore, the architecture of the server 100 may, without limitation, also be representative of a system management server 60 and/or the mobile device 50. The server 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, including a camera 110, a keyboard 118 (such as a touch screen virtual keyboard), and a USB flash drive 32 via USB port(s) 29. As depicted, the server 100 is able to communicate with other network devices over the network 40 using a network adapter or network interface controller 130. For example, the server 100 may communicate with the network attached storage 36, the mobile device 50 and/or the system management server 60 in the system 10 of FIG. 1.

A hard drive interface 132 is also coupled to the system bus 106. The hard drive interface 132 interfaces with a hard drive 134, which may store log files for the server. In a preferred embodiment, the hard drive 134 communicates with system memory 136, which is also coupled to the system bus 106. System memory is defined as a lowest level of volatile memory in the computer 100. This volatile memory may include additional higher levels of volatile memory (not shown), including, but not limited to, cache memory, registers and buffers. Data that populates the system memory 136 may include an operating system (OS) 138 and application programs 144. The hardware elements depicted in the server 100 are not intended to be exhaustive, but rather are representative. For instance, the server 100 may include non-volatile memory and the like.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management. As shown, the server 100 may include application programs 144 in the system memory of the server 100.

The server 100 also includes the Integrated Management Module (IMM) 27 or other management processor, such as a Baseboard Management Controller (BMC). In the embodiment shown, the IMM 27 runs an instance of the FELD collection agent 30. The FELD collection agent 30 may include program instructions that are executable by the management processor of the IMM 27 to cause the processor to perform operations as described herein in reference to one or more embodiments.

Figure 3:
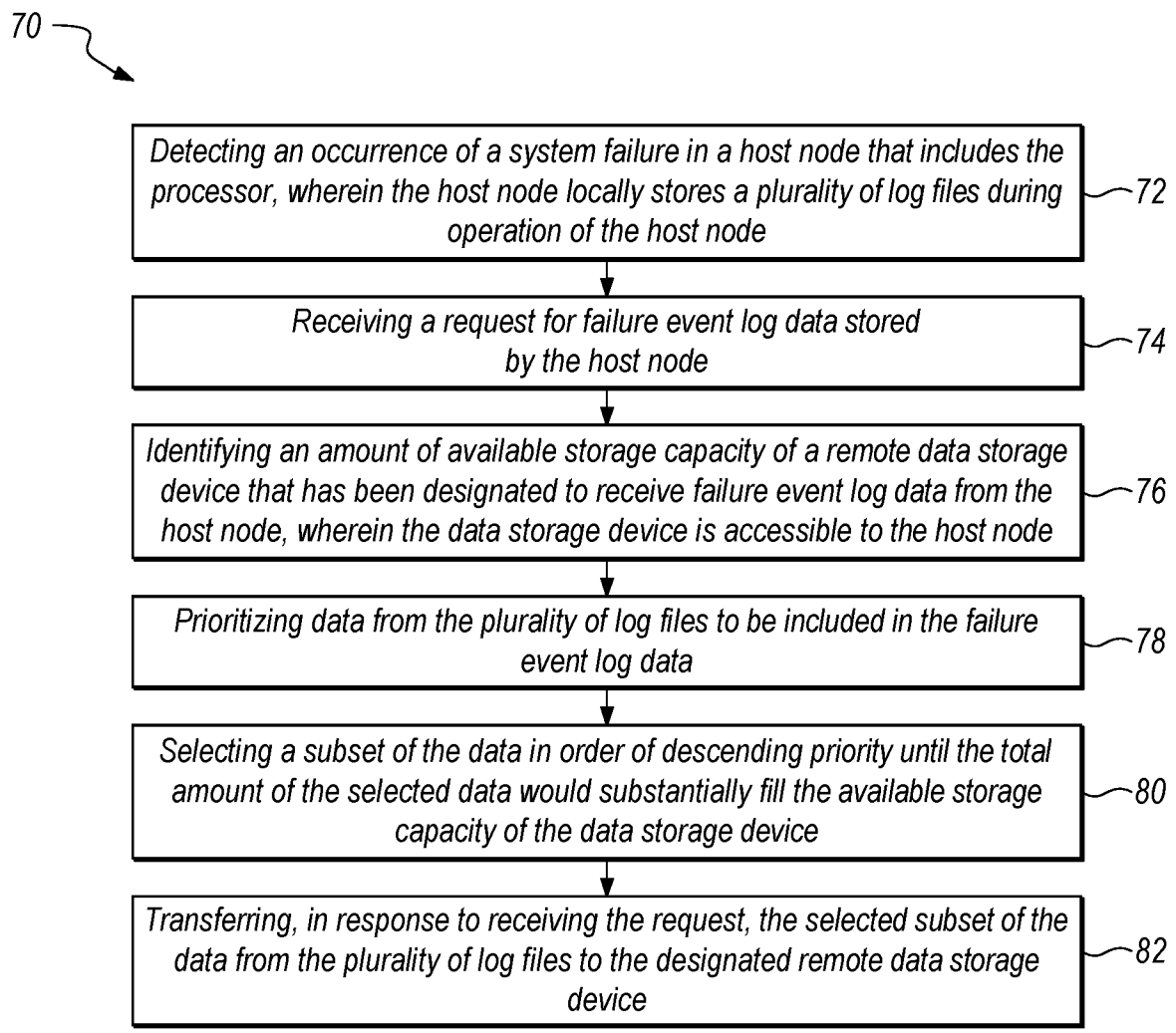
FIG. 3 is a flowchart of an embodiment of operations that may be performed by a processor of a host node.

FIG. 3 is a flowchart of operations 70 that may be performed by a processor of the server, including either a central processing unit or a management processor. Operation 72 includes detecting an occurrence of a system failure in a host node that includes the processor, wherein the host node locally stores a plurality of log files during operation of the host node. Operation 74 includes receiving a request for failure event log data stored by the host node. Operation 76 includes identifying an amount of available storage capacity of a remote data storage device that has been designated to receive failure event log data from the host node, wherein the data storage device is accessible to the host node. Operation 78 includes prioritizing data from the plurality of log files to be included in the failure event log data. Operation 80 includes selecting a subset of the data in order of descending priority until the total amount of the selected data would substantially fill the available storage capacity of the data storage device. Operation 82 includes transferring the selected subset of the data from the plurality of log files to the designated remote data storage device.

Figure 4:
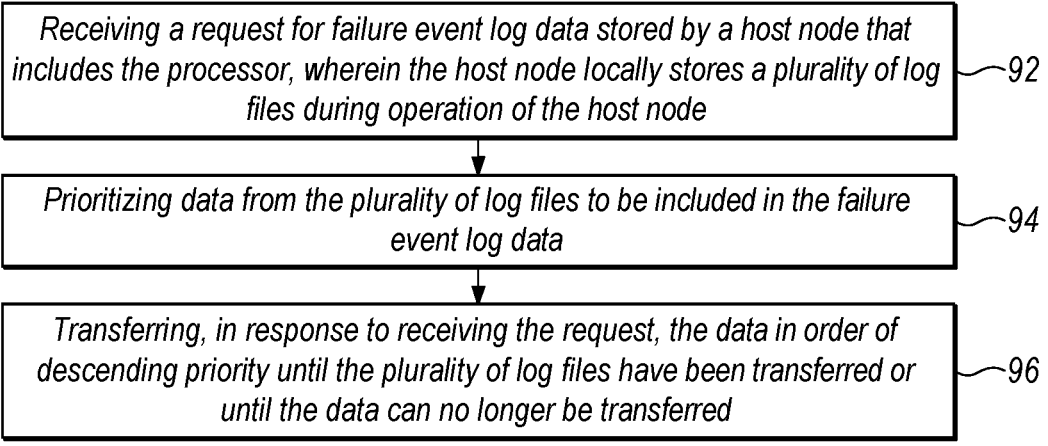
FIG. 4 is a flowchart of an embodiment of operations that may be performed by a processor of a host node or other computer.

FIG. 4 is a flowchart of operations 90 that may be performed by a processor of the host node or server, including either a central processing unit or a management processor. Operation 92 includes receiving a request for failure event log data stored by a host node that includes the processor, wherein the host node locally stores a plurality of log files during operation of the host node. Operation 94 includes prioritizing data from the plurality of log files to be included in the failure event log data. Operation 96 includes transferring, in response to receiving the request, the data in order of descending priority until the plurality of log files have been transferred or until the data can no longer be transferred.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:

detecting an occurrence of a system failure in a host node that includes the processor, wherein the host node locally stores a plurality of log files during operation of the host node;

receiving a request for failure event log data stored by the host node;

identifying an amount of available storage capacity of a remote data storage device that has been designated to receive failure event log data from the host node, wherein the remote data storage device is accessible to the host node;

prioritizing data from the plurality of log files to be included in the failure event log data;

selecting a subset of the data in order of descending priority for inclusion in the failure event log data until the total amount of the selected data would substantially fill the available storage capacity of the remote data storage device; and transferring, in response to receiving the request, the selected subset of the data from the plurality of log files to the designated remote data storage device.

2. The computer program product of claim 1, wherein the data from the plurality of log files is prioritized by a data type of each data entry in the plurality of log files, wherein the data type is identified by a tag stored for each data entry.

3. The computer program product of claim 2, wherein the data type indicates a level of severity.

4. The computer program product of claim 1, wherein the data from the plurality of log files is prioritized by a log type or log name.

5. The computer program product of claim 1, wherein the data from the plurality of log files is prioritized by a proximity in time prior to the detected occurrence of the system failure.

6. The computer program product of claim 1, wherein the data from the plurality of log files is prioritized in ascending order of a size of the log file.

7. The computer program product of claim 1, wherein the data from the plurality of log files is prioritized by a predetermined manual ranking of log files or data types.

8. The computer program product of claim 1, the program instructions being configured to be executable by a processor to cause the processor to perform operations further comprising: accessing a list identifying a plurality of previously detected system failures and, for each previous system failure, a log file or log file type that includes data associated with the previous system failure, wherein the data from the log file or log type identified in the list is included in the selected subset of the data.

9. The computer program product of claim 1, the program instructions being configured to be executable by a processor to cause the processor to perform operations further comprising:

identifying a component of the host node that experienced the system failure; and identifying a log file associated with the identified component, wherein the log file associated with the identified component is included in the selected subset of the data.

10. The computer program product of claim 1, wherein the designated data storage device is a removable flash drive coupled to an externally accessible port of the host node.

11. The computer program product of claim 1, wherein the designated data storage device is network attached storage, wherein the amount of available storage capacity is a manually configured amount for receiving failure event log data in response to each detected system failure.

12. The computer program product of claim 1, wherein data in a given log file among the plurality of log files includes data segments with different priority.

13. The computer program product of claim 12, the program instructions being configured to be executable by a processor to cause the processor to perform operations further comprising:
identifying a filename of each log file on the host node that includes any data segment of the selected subset of data, wherein, for each data segment of the selected subset of data, the data segment is stored on the data storage device in a file having the same filename as the log file on the host node from which the data segment was collected.

14. The computer program product of claim 12, the program instructions being configured to be executable by a processor to cause the processor to perform operations further comprising:
identifying the data segments so that the data segments that are included in the given log file can be concatenated for storage on the data storage device.

15. An apparatus, comprising:
at least one non-volatile storage device storing program instructions; and
at least one processor configured to process the program instructions,
wherein the program instructions are configured to, when processed by the at least one processor, cause the apparatus to perform operations comprising:
detecting an occurrence of a system failure in a host node that includes the processor, wherein the host node locally stores a plurality of log files during operation of the host node;
receiving a request for failure event log data stored by the host node;
identifying an amount of available storage capacity of a remote data storage device that has been designated to receive failure event log data from the host node, wherein the remote data storage device is accessible to the host node;
prioritizing data from the plurality of log files to be included in the failure event log data;
selecting a subset of the data in order of descending priority for inclusion in the failure event log data until the total amount of the selected data would substantially fill the available storage capacity of the remote data storage device; and
transferring, in response to receiving the request, the selected subset of the data from the plurality of log files to the designated remote data storage device.

16. A computer program product comprising a non-volatile computer readable medium and non-transitory program instructions embodied therein, the program instructions being configured to be executable by a processor to cause the processor to perform operations comprising:
receiving a request for failure event log data stored by a host node that includes the processor, wherein the host node locally stores a plurality of log files during operation of the host node;
prioritizing data from the plurality of log files to be included in the failure event log data; and
transferring, in response to receiving the request, the data in order of descending priority until the plurality of log files have been transferred or until the data can no longer be transferred.

17. The computer program product of claim 16, wherein transferring the data comprises transferring the data in order of descending priority until a power outage, a network disruption, and/or storage capacity of a receiving node is depleted.

18. The computer program product of claim 16, wherein receiving the request for failure event log data comprises receiving the request via a web interface, a command interface, and/or a remote command interface.

19. The computer program product of claim 16, wherein transferring the data comprises transferring the data via a USB port of the host node and/or over a network connection.

20. The computer program product of claim 16, wherein the data from the plurality of log files is prioritized by a data type of each data entry in the plurality of log files, wherein the data type is identified by a tag stored for each data entry.

* * * * *